United States Patent [19]

Steklenski et al.

[11] Patent Number: 4,611,027

[45] Date of Patent: Sep. 9, 1986

[54] NOVEL ACRYLONITRILE COPOLYMERS

[75] Inventors: David J. Steklenski, Rochester; Donald A. Upson, Webster; Howard M. Low, Rochester, all of N.Y.

[73] Assignee: Eastman Kodak Company, Rochester, N.Y.

[21] Appl. No.: 676,154

[22] Filed: Nov. 29, 1984

Related U.S. Application Data

[62] Division of Ser. No. 478,937, Mar. 25, 1983, Pat. No. 4,507,385.

[51] Int. Cl.$^4$ .............................................. C08F 222/30
[52] U.S. Cl. ................... 524/815; 526/287; 526/292.2
[58] Field of Search ............... 524/815; 526/287, 307, 526/307.3, 310, 312, 292.2

[56] References Cited

U.S. PATENT DOCUMENTS

| | | | |
|---|---|---|---|
| 2,983,712 | 5/1961 | Wilkinson | 526/287 |
| 3,079,257 | 2/1963 | Morcher et al. | |
| 3,332,904 | 7/1967 | LaCombe | 526/287 |
| 3,607,258 | 9/1971 | Hoegl et al. | |
| 3,709,690 | 1/1973 | Cohen | 526/329.4 |
| 4,243,746 | 1/1981 | Veda et al. | 430/346 |
| 4,374,924 | 2/1983 | Yokoyama et al. | 430/528 |
| 4,454,114 | 6/1984 | Strasilla | 424/70 |

FOREIGN PATENT DOCUMENTS

| | | | |
|---|---|---|---|
| 4324 | 1/1976 | Japan | 526/287 |
| 94912 | 7/1980 | Japan | 526/287 |
| 900195 | 7/1962 | United Kingdom | |

OTHER PUBLICATIONS

Research Disclosure, Oct. 1980, Item 19831.

*Primary Examiner*—C. Henderson
*Attorney, Agent, or Firm*—John R. Everett

[57] ABSTRACT

Novel polymers having the structure $$-A)_x, -B)_y \text{ and } -C)_z;$$

wherein

A represents a polymerized acrylonitrile monomer;
B represents a polymerized hydrophobic ethylenically unsaturated monomer;
C represents a polymerized ionically charged vinyl monomer;
x is from 10 to 90 weight percent;
y is from 5 to 40 weight percent except that when B is a vinyl halide monomer, y is 10 to 89.9 weight percent; and
z is from 0.1 to 10 weight percent The polymers are useful in forming protective overcoats for photographic elements.

2 Claims, No Drawings

NOVEL ACRYLONITRILE COPOLYMERS

This is a division of application Ser. No. 478,937 filed Nov. 25, 1983 now U.S. Pat. No. 4,507,385.

FIELD OF THE INVENTION

The present invention relates to a novel class of acrylonitrile copolymers, latex compositions comprising such copolymers and the use of such copolymers in forming protective coatings for photographic elements.

DESCRIPTION RELATIVE TO THE PRIOR ART

Protective coatings for photographic elements containing silver halide layers are well known. Protective coatings have been formulated for both the emulsion side, that is, the side of the element which carries the layer containing the silver halide in a hydrophilic binder, and the other side of the element, commonly referred to in the art as the support side or the base side. These coatings are designed to provide a variety of properties such as resistance to abrasion and resistance to static charging.

Certain photographic elements have further requirements which must be met by the base side protective overcoat. For example, the base side of the photographic element is often coated with an antistatic layer. This antistatic layer generally comprises a binder having dispersed therein a conductive compound. The protective coating is applied over the antistatic layer. Frequently, chemicals in photographic processing solution or in the environment are capable of reacting with the conductive compound in the antistatic layer, thus causing the antistatic layer to lose much of its conductivity. Thus, a protective layer for an element having a base side antistatic layer must be capable of chemically isolating the antistatic layer.

Certain types of photographic elements, including electrophotographic elements, have certain further requirements. Elements which are used in motion pictures are cleaned using chlorinated hydrocarbon solvents. In addition, the elements are duplicated in what is known in the art as a "wet gate" printer. In a wet gate printer, the printing gate is constructed so that the photographic element to be duplicated is immersed in a chlorinated hydrocarbon solvent during the duplicating exposure. Also, electrophotographic elements are often cleaned with standard, chlorinated film-cleaning solvents. A useful base side protective coating for these types of elements must be resistant to chlorinated hydrocarbon solvents.

Many base side overcoat compositions are deficient in one or more respects. One class of conventional overcoats is the acrylate polymers. These polymers provide excellent abrasion resistance, charging characteristics, ferrotyping resistance and other desirable properties. Unfortunately, however, they are readily removed or softened by chlorinated hydrocarbon solvents. Acrylate polymer protective overcoats are described in relation to the polyaniline imine salt-containing antistatic layers of U.S. Pat. No. 4,237,194.

Another class of polymers, such as some acrylonitrile copolymers, must be coated from organic solvents. There are several disadvantages to the use of only organic solvents for coating polymer layers. Elaborate and costly machinery is required to prevent escape of organic solvent vapors into the environment. In addition, the solvents themselves are costly and are generally flammable. Such solvents frequently cause the film base to curl. Control over curl is possible but not without compromising coating versatility or expenditure of additional energy.

It is readily apparent that there is a continuing need for aqueous-based overcoats for the base side of photographic elements. The need is particularly acute for elements which contain a layer, such as an antistatic layer, which must be chemically isolated and which must be protected from chlorinated hydrocarbon solvents.

SUMMARY OF THE INVENTION

The present invention provides a novel class of polymers from which protective overcoats for photographic elements, including electrophotographic elements, are formed from aqueous latex compositions. The overcoats are resistant to photographic processing solutions and chlorinated organic solvents commonly used in film cleaning and printing operations. The abrasion resistance of the overcoats is enhanced by the addition of anti-abrasion agents. The overcoats are uniformly coalesced, optically clear and exhibit no adverse effects on the properties of other layers such as the resistivity of antistatic layers.

The overcoats are formed from latex coating compositions comprising one or more novel polymers having the random structure $-A)_x$, $-B)_y$ and $-C)_z$;

wherein

A represents a polymerized acrylonitrile monomer;
B represents a polymerized hydrophobic ethylenically unsaturated monomer;
C represents a polymerized ionically charged vinyl monomer;
x is from 10 to 90 weight percent;
y is from 5 to 40 weight percent except that when B is a vinyl halide monomer, y is 10 to 89.9 weight percent; and
z is from 0.1 to 10 weight percent.

The present invention also provides a photographic element, including an electrophotographic element, comprising a support and a layer of the present invention.

The polymers of the present invention form protective overcoats which are particularly useful with elements which contain an antistatic layer on the base side of the support. Thus, in another aspect of the present invention there is provided a photographic element wherein the side opposite the radiation-sensitive layer has thereon, in order, an antistatic layer overcoated with a layer of the present invention.

PREFERRED EMBODIMENTS

In a preferred embodiment. the polymers from which the overcoats are formed have the foregoing structure wherein B is selected from the group consisting of alkyl acrylates and alkyl methacrylates wherein alkyl refers to groups having from 1 to 12 carbon atoms such as ethyl, propyl, butyl, octyl, ethylhexyl and cyclohexyl, and vinyl halides, etc;

C is selected from the group consisting of N-(2-methacryloyloxyethyl)-N,N,N-trimethylammonium methosulfate; N,N,N-trimethyl-N-vinylbenzylammonium chloride and N-(3-methacrylamidopropyl)-

N,N,N-trimethylammonium chloride and sodium 2-acrylamido-2-methylpropanesulfonate;

x is from 20 to 80 weight percent;

y is from 10 to 30 weight percent except that when B is a vinyl halide monomer, y is 15 to 79.9 weight percent; and z is from 0.1 to 2 weight percent.

DETAILED DESCRIPTION OF THE INVENTION

The polymers of the invention are conveniently prepared as a latex by known emulsion polymerization techniques. Descriptions of such techniques are disclosed in W. P. Sorenson and T. W. Campbell "*Preparative Methods of Polymer Chemistry*", 2nd Edition, N.Y., N.Y., Wiley (1968) and M. P. Stevens "*Polymer Chemistry - an Introduction*", Addison-Wesley Publishing Co., Reading, Mass. (1975).

Generally, the polymers are prepared by:

a. dissolving a surfactant and a polymerization catalyst in deoxygenated water;

b. mixing the solution of a) in a head tank with a mixture consisting of from 10 to 90 weight percent of a hydrophobic ethylenically unsaturated monomer; from 10 to 90 weight percent of acrylonitrile; and from 0.1 to 10 weight percent of a ionically charged vinyl monomer;

c. adding a solution of the surfactant and polymerization catalyst to a reactor;

d. adjusting the solution in the reactor to a pH of between 2 and 4;

e. heating the reactor;

f. reacting the mixture of b) by adding the mixture to the reactor over a period of about 1 hour;

g. continuing the reaction for at least 1 hour;

h. cooling the reactor and filtering the contents.

Useful hydrophobic ethylenically unsaturated monomers include methyl acrylate, ethyl acrylate, propyl acrylate, butyl acrylate, amyl acrylate, 2-ethylhexyl acrylate, octyl acrylate, t-octyl acrylate, 2-methoxyethyl acrylate, 2-butoxyethyl acrylate, 2-phenoxyethyl acrylate, cyanoethyl acrylate, benzyl acrylate, methoxybenzyl acrylate, furfuryl acrylate, tetrahydrofurfuryl acrylate, phenyl acrylate, vinylidene chloride, vinyl chloride, methyl methacrylate, ethyl methacrylate, propyl methacrylate, isopropyl methacrylate, butyl methacrylate, amyl methacrylate, hexyl methacrylate, cyclohexyl methacrylate, benzyl methacrylate, octyl methacrylate, 2-methoxyethyl methacrylate, 2-(3-phenylpropyloxy)ethyl methacrylate, furfuryl methacrylate, tetrahydrofurfuryl methacrylate, phenyl methacrylate, naphthyl methacrylate, styrene and substituted styrenes such as methylstyrene and t-butylstyrene and the like.

Examples of cationically charged vinyl monomers include N-(2-methacryloyloxyethyl)-N,N,N-trimethylammonium methosulfate; N,N,N-trimethyl-N-vinylbenzylammonium chloride and N-(3-methacrylamidopropyl)-N,N,N-trimethylammonium chloride.

Examples of anionically charged vinyl monomers include sodium 4-acryloyloxybutane-1-sulfonate, sodium 3-acryloyloxy-1-methylpropane-1-sulfonate, sodium 2-acryloyloxyethylsulfate, sodium 2-methacryloyloxyethylsulfate, sodium 3-acrylamidopropane-1-sulfonate, sodium acrylate, sodium p-styrenesulfonate, sodium vinylphenylmethanesulfonate, sodium 3-methylacryloyloxypropane-1-sulfonate, sodium 3-methacryloyloxypropane-1-methyl-1-sulfonate, sodium 4-methacryloyloxybutane-1-sulfonate, sodium 2-methacryloyloxyethyl-1-sulfate, 3-methacryloyloxypropane-1-sulfonic acid, zinc salt, sodium 3-acryloyloxypropane-1-sulfonate, sodium methacrylate, lithium methacrylate, N-[3-(N-phenylsulfonyl-N-sodiosulfamoyl)phenyl]acrylamide, N-[2-(N-methylsulfonyl-N-potassiosulfamoyl)ethyl]methacrylamide, ammonium p-styrenesulfonate and sodium 2-acrylamido-2-methylpropanesulfonate.

Useful surfactants include hexadecyltrimethylammonium bromide, representative of cationic surfactants and Igepal CO-730 ® (an ethoxylated nonylphenol) representative of non-ionic surfactants.

Useful catalysts include 2,2'-azobis(2-amidinopropane . hydrochloride), 2,2'-azobis(2-methylpropionitrile), and benzoyl peroxide.

Examples of polymers made according to the previously described method are disclosed in Table I. The weight percent of each monomer in each of the listed polymers is set out in parenthesis immediately following the polymer name.

TABLE I

| Polymer | Name |
|---|---|
| 1 | poly[n-butyl acrylate-co-acrylonitrile-co-N—(2-methacryloyloxyethyl)-N,N,N—trimethylammonium methosulfate] (weight ratio 20/78/2); |
| 2 | poly[ethyl acrylate-co-acrylonitrile-co-N—(2-methacryloyloxyethyl)-N,N,N—trimethylammonium methosulfate] (weight ratio 23.9/76/0.1); |
| 3 | poly[vinylidene chloride-co-acrylonitrile-co-N—(2-methacryloyloxyethyl)-N,N,N—trimethylammonium methosulfate] (weight ratio 73/25/1.6) |
| 4 | poly[vinylidene chloride-co-acrylonitrile-co-N—(2-methacryloyloxyethyl)-N,N,N—trimethylammonium methosulfate] (weight ratio 58/40/1.6) |
| 5 | poly(ethyl acrylate-co-acrylonitrile-co-sodium 2-acrylamido-2-methylpropanesulfonate) (weight ratio) 23.9/76/0.1) |

The protective overcoat layers of the present invention are coated from a latex composition of the novel polymers. Abrasion resistance of the overcoats is enhanced by the addition of antiabrasion agents such as Poly 316 N-30 ® wax emulsion (a wax emulsion composition available from Chemical Corp. of America) to the latex. Other polyethylene wax emulsions as well as the emulsions of other synthetic and natural waxes which are substantially insoluble in chlorinated solvents are also useful. In addition, crosslinked silicones, waxes or polymers which provide a reduced surface coefficient of friction are useful. Such abrasion resistant agents are useful in amounts of from 0.5 to 10 percent based on the weight of polymer.

Ethylene carbonate or resorcinol, are optionally used as fugitive coalescents (plasticizers) to lower the polymer Tg during coating. Other commonly used coalescents such as butyl CARBITOL ® acetate and ethyl CARBITOL ® (Union Carbide Corp.) are also useful. Such coating aids are useful in amounts of from 10 to 50 percent based on the weight of polymer.

The weight percent solids in the coating composition which is useful to form the layers of the present invention varies widely. A useful range for the weight percent solids in the latex composition is generally between about 1 percent to about 20 percent.

The latex is coated to produce the protective layers of the present invention using any suitable method. For example, the compositions are coated by spray coating, fluidized bed coating, dip coating, doctor blade coating or extrusion hopper coating.

The coated layers are resistant to chlorinated hydrocarbon solvents and photographic processing compositions. By resistant to chlorinated hydrocarbon solvents is meant that the coated and dried layer is substantially unaffected when contacted with the described solvent.

The determination of whether a particular composition will be resistant to chlorinated hydrocarbon solvents is carried out by the following simple test. The composition of interest is coated on a suitable support such as a glass slide or a poly(ethylene terephthalate) support and allowed to dry. A sample of the element is then passed through an ultrasonically agitated bath of 1,1,1-trichloroethane at 40° C. such that its residence time in the bath is 8 to 10 seconds. The coating is then visually examined to determine the effect of this treatment. If the layer remains intact during this treatment, it is considered to be resistant to chlorinated hydrocarbon solvents.

By "resistant to photographic processing solutions" is meant that the layer is capable of chemically isolating underlayers from high pH solutions. One method of determining whether a layer such as a pH sensitive layer is chemically isolated is to include a pH indicator dye in the underlayer and observe the underlayer before and after contact with the solution. If there is little or no change, the underlayer is sufficiently isolated.

Photographic elements comprise a support, at least one radiation-sensitive layer and an overcoat layer of the present invention. The overcoat layer is the outermost layer on the base side of the photographic element. The other side of the photographic element, commonly referred to as the emulsion side, has as its outermost layer a hydrophilic layer. This hydrophilic layer is either the radiation-sensitive layer itself such as one containing silver halide, or an overcoat layer which is hydrophilic so as to facilitate processing of the element. This outermost hydrophilic layer optionally contains a variety of addenda such as matting agents, antifoggants, plasticizers and haze-reducing agents. The outermost hydrophilic layer comprises any of a large number of water-permeable hydrophilic polymers. Typical hydrophilic polymers include gelatin, albumin, poly(vinyl alcohols) and hydrolyzed cellulose esters.

The protective overcoat layers of the present invention are particularly useful over antistatic layers on the base side of a silver halide photographic element. Useful antistatic layers include those described in U.S. Pat. Nos. 3,399,995, 3,674,711 and 3,011,918 which relate to layers containing water-dispersible, particulate polymers. One particularly preferred antistatic layer is described in U.S. Pat. No. 4,070,189 which relates to the use of water-dispersible, particulate vinylbenzyl quaternary ammonium or phosphonium salt polymers. Another useful antistatic layer of this type is described in U.S. Pat. No. 4,294,739.

A preferred class of antistatic layer compositions includes a polyaniline imine salt semiconductor. Compositions of this type are described, for example, in U.S. Pat. Nos. 3,963,498 and 4,237,194. The compositions of U.S. Pat. No. 4,237,194 are particularly preferred because they exhibit high conductivity at low coverages of the semiconductor. The antistatic layer of this patent comprises a coalesced, cationically stabilized latex and a polyaniline imine acid addition salt semiconductor wherein the latex and the semiconductor are chosen so that the semiconductor is associated with the latex before coalescing. Particularly preferred latex binders include cationically stabilized, coalesced, substantially linear, polyurethanes.

Photographic silver halide radiation-sensitive layers are well-known in the art. Such layers are more completely described in *Research Disclosure*, December 1978, pages 22–31, item 17643. *Research Disclosure* is published by Industrial Opportunities, Ltd., Homewell, Havent, Hampshire, PO9 1EF, United Kingdom.

The photographic elements of the present invention include a support. Useful supports include those described in paragraph XVII of the above-identified *Research Disclosure*. Particularly useful supports include cellulose acetate and poly(ethylene terephthalate).

The following examples are presented to illustrate the practice of the present invention.

EXAMPLE 1

Preparation 1, Polymer 1, Table I

First, 6.6 g of hexadecyltrimethylammonium bromide surfactant, 26.6 g of 30% active Igepal CO-730 ® surfactant, and 11.2 g of 2,2'-azobis-(2-amidinopropane . HCl) were dissolved in 2500 g of deoxygenated water. The pH was adjusted to 2.3 with 10% $H_3PO_4$.

The resulting solution was mixed with a mixture consisting of 500 g of butyl acrylate, 1950 g of acrylonitrile, and 62.5 g of 80% active (50.0 g of polymerizable monomer) N-(2-methacryloyloxyethyl)-N,N,N-trimethylammonium methosulfate. This complex mixture is referred to as the head tank and is preferably kept at below room temperature.

A solution consisting of 18.4 g of hexadecyltrimethylammonium bromide surfactant, 56.7 g of 30% active Igepal CO-730 ® surfactant (GAF Corp.), and 1.3 g of 2,2'-azobis(2-amidinopropane . HCl) in 11,534 g of deoxygenated water was added to a reactor. The pH was adjusted to 2.3 with 10% $H_3PO_4$.

The reactor was heated to 75° C. and the head tank contents were added to the reactor over 2 hours. The reaction proceeded for 2.5 hours, and was then cooled and filtered. The product was a stable, 15% solids content latex.

EXAMPLE 2

A. Preparation and Testing of Coated Films of Polymer 1

Into a clean vessel 40 g of the latex prepared in Example 1, 3.0 mL of a 10% (wt/wt) solution of Igepal CO-630 ®, 3.0 ml of 10% Poly 316 N-30 ® wax emulsion containing 1.25% (wt/wt) of hexadecyltrimethylammonium bromide, 45 ml of water and 9 ml of 20% (wt/wt) resorcinol was added. The resulting latex dispersion was applied as a protective overcoat over conducting layers as described in Example 1 of U.S. 4,237,194 at a wet coverage of 1 ml/ft² (10.76 ml/m²) and was dried and cured for 2 minutes at 120° C. to give an optically clear, coalesced film.

B. Performance Tests

Samples of the element prepared above were immersed in a warm (105° F.) photographic aqueous alkaline phenylenediamine color developer solution for 3, 6 and 9 minutes, then washed and dried. The pH of the developer was 11.0. Essentially no effect on the physical or electrical properties of the element was observed.

The same films were then passed through a simulated film-cleaning device in which the films were treated with ultrasonically agitated 1,1,1-tricholorethane at 105° F. (40° C.) for 8-10 seconds. Films were tested for electrical properties and scratch resistance after 1, 10 and 20 passes through the simulated cleaner. There was no change in appearance, and there were essentially no cleaner-induced effects on resistivity or scratch resistance as shown below.

| Number of Passes | Coating Resistivity $\Omega$/sq | Single arm Scratch First Line at 4 feet |
|---|---|---|
| 0 | $3.0 \times 10^7$ | >100 g |
| 1 | $2.7 \times 10^7$ | >100 g |
| 10 | $3.2 \times 10^7$ | >100 g |
| 20 | $3.2 \times 10^7$ | >100 g |

In the "single arm scratch test", a stylus was pulled across the surface of each film under various loads. The weight needed to cause the first scratch is recorded as the test result. The films resisted scratching for loads in excess of 100 grams.

To simulate wet-gate immersion printing, the films were immersed in perchloroethylene for 15, 30 and 60 seconds and then dried. Again, no effects were observed on the physical or electrical properties of the element.

EXAMPLE 3

By way of comparison, a latex dispersion and coated films were prepared exactly as in Example 1 except that the latex used was poly(n-butyl acrylate-co-methyl methacrylate) (20/80). Clear, coalesced films which showed no change in physical or electrical properties on treatment with aqueous alkaline phenylenediamine color developer solutions were obtained by coating and drying of the latex dispersions. Although these films are excellent barriers to penetration by aqueous processing solutions, these films were substantially removed in the simulated film cleaner with the remaining film being quite badly hazed after only a single pass through the simulated film cleaner.

EXAMPLE 4

Preparation of Polymer 3, Table 1

A reactor was charged with 6.84 kg of deoxygenated distilled water, 32.4 g of hexadecyltrimethylammonium bromide, 97.2 g of Igepal CO-730 ®, 5.4 ml of 0.1 NH$_2$SO$_4$, 405.0 g of acrylonitrile, 1,182.6 g of vinylidene chloride, 32.4 g of 80% active (25.9 g of polymerizable monomer) N-(2-methacryloyloxyethyl)-N,N,N-trimethylammonium methosulfate and 30 g of 2,2'azobis(2-amidinopropane . HCl).

The reaction was allowed to proceed for 10 hours. The product was cooled and filtered to give a stable, 20% solids content latex.

EXAMPLE 5

A blended latex coating dispersion was prepared as follows:

In a vessel were placed 20 g of a 15% (wt/wt) cationically stabilized latex of polymer 2, Table I; 15 g of a 20% (wt/wt) cationically stabilized latex of polymer 3, 3 ml of a 10% (wt/wt) solution of Igepal CO-630 ®, 3.0 ml of 10% Poly 316 N-30 ® wax emulsion containing 1.25% (wt/wt) of hexadecyltrimethylammonium bromide, 56.6 ml of water, and 2.4 ml of 50% (wt/wt) ethylene carbonate in water. Coated films of this dispersion were prepared and tested as in Example 2. The films were unaffected by alkaline photographic developers, by multiple exposures to the film cleaning treatment, or by immersion in perchloroethylene.

EXAMPLE 6

This example shows the effectiveness of overcoats formed from a latex composition of the invention comprising an anionic polymer.

A latex (19.4% solids) was prepared containing polymer 5 of Table I. The preparation was carried out as follows:

First, 1.0 g of Alipal CO-436 ® surfactant (58% active, GAF Corporation) and 0.25 g of sodium meta bisulfite were dissolved in 100 g of deoxygenated water. The pH was adjusted to 2.3 with 10% H$_3$PO$_4$.

The resulting solution was mixed with a mixture consisting of 23.9 g of ethyl acrylate, 76.0 g of acrylonitrile, and 0.1 g of sodium 2-acrylamido-2-methylpropanesulfonate. This complex mixture is referred to as the head tank and is preferably kept at below room temperature.

A solution consisting of 2.5 g of Alipal CO-436 ® and 0.5 g of potassium persulfate in 296 g of deoxygenated water was added to a reactor. The pH was adjusted to 2.3 with 10% H$_3$PO$_4$.

The reactor was heated to 75° C. and the head tank contents were added to the rector over 45 minutes. The reaction proceeded for 3 hours and was then cooled and filtered. The product was a stable, 19.4% solids content latex.

In addition to polymer 5, the latex also included 5 weight percent of Igepal CO-630 ®, 5 weight percent of Poly 316 N-30 ® and 20 weight percent ethylene carbonate.

Coatings were made over the same conducting layer used in Example 2. The coating had a slight uniform haze, survived 3 minutes in the processing bath used in Example 2, and was unchanged after 10 passes through the simulated film cleaner described in Example 2. The scratch resistance was outstanding before and after being passed through the simulated film cleaning device.

A coating on a poly(ethylene terephthalate) support having a subcoating was clear and survived 10 passes through the simulated film cleaning device.

The invention has been described in detail with particular reference to preferred embodiments thereof, but it will be understood that variations and modifications can be effected within the spirit and scope of the invention.

We claim:
1. A polymer selected from the group consisting of
poly[n-butyl acrylate-co-acrylonitrile-co-N-(2-methacryloyloxyethyl)-N,N,N-trimethylammonium methosulfate] (weight ratio 20/78/2);
poly[ethyl acrylate-co-acrylonitrile-co-N-(2-methacryloyloxyethyl)-N,N,N-trimethylammonium methosulfate] (weight ratio 23.9/76/0.1);
poly[vinylidene chloride-co-acrylonitrile-co-N-(2-methacryloyloxyethyl)-N,N,N-trimethylammonium methosulfate] (weight ratio 73/25/1.6); and poly[vinylidene chloride-co-acrylonitrile-co-N-(2-methacryloyloxyethyl)-N,N,N-trimethylammonium methosulfate] (weight ratio 58/40/1.6).

2. A latex composition wherein the polymer is selected from the group consisting of poly[n-butyl acrylate-co-acrylonitrile-co-N-(2-methacryloyloxyethyl)-N,N,N-trimethylammonium methosulfate] (weight ratio 20/78/2);

poly[ethyl acrylate-co-acrylonitrile-co-N-(2-methacryloyloxyethyl)-N,N,N-trimethylammonium methosulfate] (weight ratio 23.9/76/0.1);

poly[vinylidene chloride-co-acrylonitrile-co-N-(2-methacryloyloxyethyl)-N,N,N-trimethylammonium methosulfate] (weight ratio 73/25/1.6); and poly[vinylidene chloride-co-acrylonitrile-co-N-(2-methacryloyloxyethyl)-N,N,N-trimethylammonium methosulfate] (weight ratio 58/40/1.6).

* * * * *

UNITED STATES PATENT AND TRADEMARK OFFICE
CERTIFICATE OF CORRECTION

PATENT NO. : 4,611,027
DATED : September 9, 1986
INVENTOR(S) : David J. Steklenski, Donald A. Upson and Howard Low It is certified that error appears in the above-identified patent and that said Letters Patent are hereby corrected as shown below:

Title page, Item 57 "Abstract", structure reading

" $-A)_x$, $-B)_y$ and $-C)_z$; "

should read

-- $-(A)_{\overline{x}}$, $-(B)_{\overline{y}}$ and $-(C)_{\overline{z}}$; --

Signed and Sealed this

Twenty-fourth Day of March, 1987

Attest:

DONALD J. QUIGG

Attesting Officer

Commissioner of Patents and Trademarks